US012555944B2

(12) United States Patent
Takagi

(10) Patent No.: US 12,555,944 B2
(45) Date of Patent: Feb. 17, 2026

(54) ELECTRIC CONNECTOR

(71) Applicant: HIROSE ELECTRIC CO., LTD., Kanagawa (JP)

(72) Inventor: Yuta Takagi, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 266 days.

(21) Appl. No.: 18/478,110

(22) Filed: Sep. 29, 2023

(65) Prior Publication Data

US 2024/0113466 A1 Apr. 4, 2024

(30) Foreign Application Priority Data

Oct. 3, 2022 (JP) ................................ 2022-159446

(51) Int. Cl.
*H01R 12/71* (2011.01)
*H01R 13/405* (2006.01)
*H01R 12/78* (2011.01)

(52) U.S. Cl.
CPC ......... *H01R 13/405* (2013.01); *H01R 12/716* (2013.01); *H01R 12/78* (2013.01)

(58) Field of Classification Search
CPC ............................ H01R 13/405; H01R 12/716
See application file for complete search history.

(56) References Cited

U.S. PATENT DOCUMENTS

| | | | | |
|---|---|---|---|---|
| 8,888,506 B2 * | 11/2014 | Nishimura | H01R 13/405 439/74 |
| 9,647,361 B2 * | 5/2017 | Kobuchi | H01R 12/707 |
| 12,418,122 B2 * | 9/2025 | Ashibu | H01R 13/2407 |
| 2017/0098900 A1 | 4/2017 | Kobuchi et al. | |

FOREIGN PATENT DOCUMENTS

JP 2017-69133 A 4/2017

* cited by examiner

*Primary Examiner* — Neil Abrams
(74) *Attorney, Agent, or Firm* — RANKIN, HILL & CLARK LLP

(57) ABSTRACT

Provided is an electric connector which includes: a terminal; and a housing, in which the terminal has a bottom portion, a first leg portion, and a second leg portion, the housing has a first side wall, the first leg portion extends in a fitting direction of fitting to a partner connector from a first direction side of the bottom portion, and is elastically deformable in a first direction, the second leg portion extends in the fitting direction from a second direction side of the bottom portion, and is elastically deformable in a second direction, the first side wall extends in the fitting direction to hold the second leg portion, and when a terminal of the partner connector is inserted into between the bottom portion, the first leg portion, and the second leg portion, the second leg portion and the first side wall are elastically deformed in the second direction.

8 Claims, 9 Drawing Sheets

ELECTRIC CONNECTOR

CROSS-REFERENCE TO RELATED APPLICATION

This application claims priority from Japanese Patent Application No. 2022-159446 filed with the Japan Patent Office on Oct. 3, 2022, the entire content of which is hereby incorporated by reference.

BACKGROUND

1. Technical Field

The present disclosure relates to an electric connector.

2. Related Art

Typically, various techniques on an electric connector having a terminal and a housing for connection to, e.g., a printed circuit board or a flexible flat cable have been known. For example, JP-A-2017-69133 discloses an electric connector including a housing having a terminal housing portion opened upward in an upper-lower direction (fitting direction) and a bottom portion positioned below the terminal housing portion and a terminal having a base portion embedded and held in the bottom portion of the housing, a spring portion extending upward from the base portion and elastically deformably housed in the terminal housing portion, and a contact portion supported on the spring portion.

In the electric connector disclosed in JP-A-2017-69133, when a terminal of a partner connector is inserted into the terminal housing portion, the terminal of the partner connector contacts the contact portion of the terminal of the electric connector, and the spring portion supporting the contact portion is elastically deformed in a lateral direction. Accordingly, elastic force (force equivalent to contact pressure) is provided to the terminal of the partner connector. In this manner, the spring portion of the electric connector holds the terminal of the partner connector, and electric connection between the terminals of the connectors is ensured.

SUMMARY

An electric connector according to an embodiment of the present disclosure includes: a terminal; and a housing holding the terminal, in which the terminal has a bottom portion, a first leg portion, and a second leg portion, the housing has a first side wall, the first leg portion extends in a fitting direction of fitting to a partner connector from a first direction side of the bottom portion, and is elastically deformable in a first direction, the second leg portion extends in the fitting direction from a second direction side of the bottom portion opposite to the first direction side, and is elastically deformable in a second direction, the first side wall extends in the fitting direction to hold the second leg portion, and when a terminal of the partner connector is inserted into between the bottom portion, the first leg portion, and the second leg portion, the second leg portion and the first side wall are elastically deformed in the second direction.

DETAILED DESCRIPTION

Figure 1:
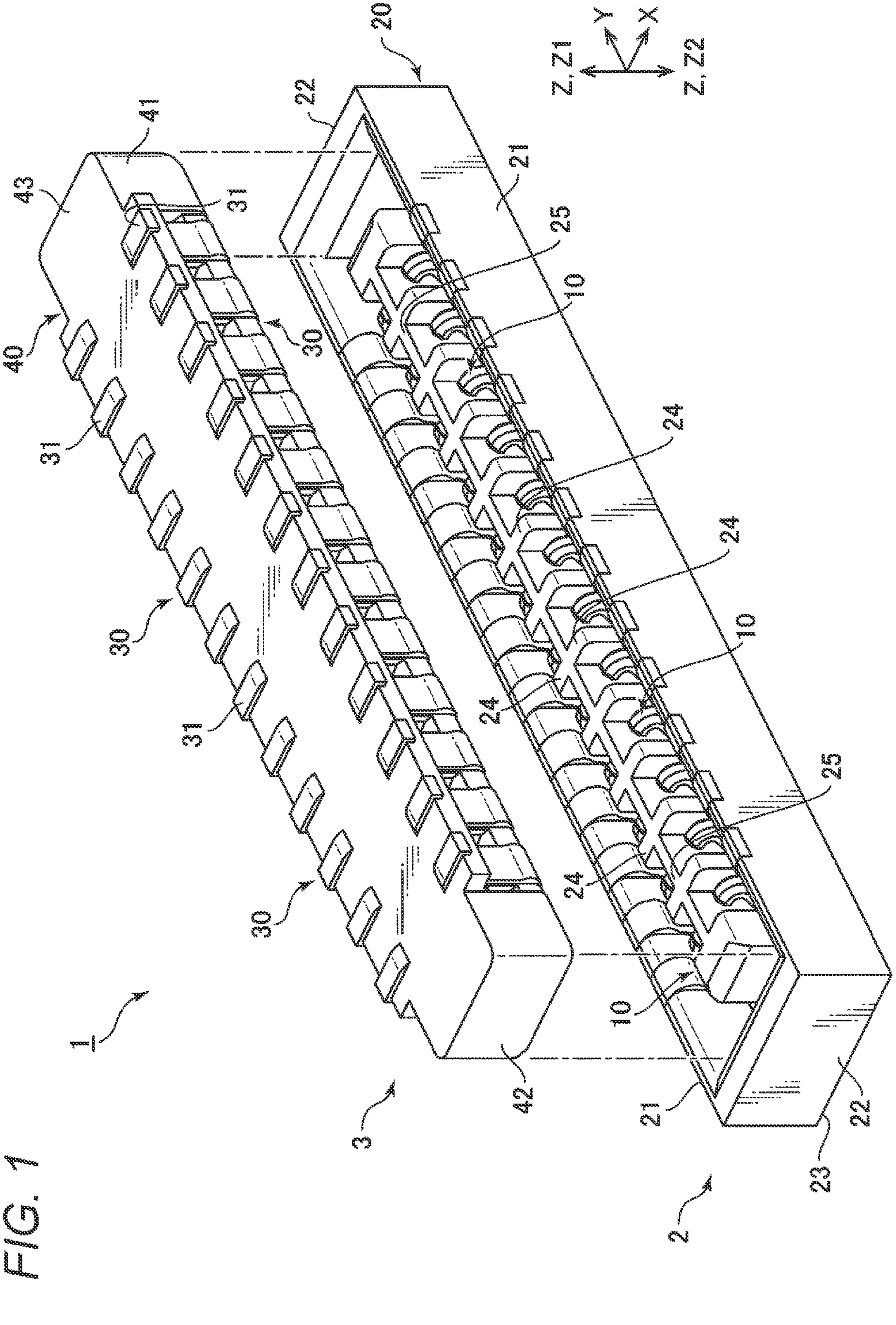
FIG. 1 is a perspective view of a connector assembly according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In recent years, due to, e.g., size reduction and function enhancement in electronic devices such as smartphones and mobile phones, the density of electronic components mounted on a printed circuit board has been increased, and accordingly, there has also been a demand for size reduction in an electric connector itself. With size reduction in the electric connector, a terminal and a housing are also extremely reduced in size.

If the electric connector described in JP-A-2017-69133 is reduced in size, the spring portion of the terminal is extremely reduced in size (thickness) due to such size reduction in the terminal. As a result, the elastic force of the spring portion of the terminal decreases, and it is difficult to provide sufficient contact pressure to the terminal of the partner connector. For this reason, for example, if the electric connector is repeatedly detached and attached, electric connection between the terminals cannot be ensured in some cases.

The present disclosure has been made to solve the above-described problem, and is intended to provide an electric connector capable of properly ensuring contact pressure to be provided to a partner connector even if the electric connector is reduced in size.

An electric connector according to one embodiment of the present disclosure includes: a terminal; and a housing holding the terminal, in which the terminal has a bottom portion, a first leg portion, and a second leg portion, the housing has a first side wall, the first leg portion extends in a fitting direction of fitting to a partner connector from a first direction side of the bottom portion, and is elastically deformable in a first direction, the second leg portion extends in the fitting direction from a second direction side of the bottom portion opposite to the first direction side, and is elastically deformable in a second direction, the first side wall extends in the fitting direction to hold the second leg portion, and when a terminal of the partner connector is inserted into between the bottom portion, the first leg portion, and the second leg portion, the second leg portion and the first side wall are elastically deformed in the second direction.

According to the electric connector according to the present disclosure, the contact pressure to be provided to the partner connector can be properly ensured even if the electric connector is reduced in size.

Hereinafter, an embodiment of the present disclosure will be described with reference to the drawings. Note that in all figures for describing the embodiment, the same reference numerals are used to represent the same members in principle and repeated description thereof will be omitted. Moreover, each embodiment (also including modifications) will be independently described, but is not intended to exclude electric connectors configured by combination of components.

[Configurations of Electric Connector and Connector Assembly]

First, the configuration of a connector assembly according to one embodiment of the present disclosure will be described with reference to FIG. 1. FIG. 1 is a perspective view of the connector assembly according to the present embodiment from a plug connector side.

As shown in FIG. 1, the connector assembly 1 according to the present embodiment has a receptacle connector 2 and a plug connector 3, and the receptacle connector 2 and the plug connector 3 are fittable to each other. Hereinafter, in a case where the receptacle connector 2 and the plug connector 3 are not distinguished from each other, these connectors will be referred to as a "connector(s) 2, 3" or merely as a "connector(s)." The connector 2, 3 is mounted on a board, such as a printed circuit board, which is a not-shown predetermined member. Specifically, the receptacle connector 2 and the plug connector 3 are attached, on a bottom wall 23 side and a bottom wall 43 side, to the boards. The connector 2, 3 may be used as an internal component of a small electronic device such as a mobile phone, a smartphone, a digital camera, or a laptop computer, for example. Note that the receptacle connector 2 is one example of an "electric connector" of the present disclosure. Hereinafter, an example where the receptacle connector 2 is mounted on the board will be described. The receptacle connector 2 is also mountable, other than the board such as the flexible printed circuit board, on various members (predetermined members) such as a flexible flat cable.

In FIG. 1 (the same also applies to other figures), the lateral direction (width direction) of the connector will be referred to as "X," the longitudinal direction (depth direction) of the connector will be referred to as "Y," and the fitting direction (upper-lower direction) of the connector will be referred to as "Z." Of the sides of a certain connector in the fitting direction Z, the side on which the connector receives a partner connector will be defined as "upper" or "front" and the side on which the connector is attached to the board will be defined as "lower" or "back" in the present specification. Of the receptacle connector 2, a direction indicated by "Z1" in the fitting direction Z is specifically equivalent to an "upper direction," and a direction indicated by "Z2" in the fitting direction Z is specifically equivalent to a "lower direction." Of the plug connector 3, a direction indicated by "Z2" in the fitting direction Z is, on the other hand, equivalent to an "upper direction," and a direction indicated by "Z1" in the fitting direction Z is equivalent to a "lower direction."

In the present disclosure, the lateral direction X of the connector has an X1-direction and an X2-direction opposite to the X1-direction. The X1-direction is a direction inward of the connector along the lateral direction of the connector, and is equivalent to a "first direction" in the present disclosure. The X2-direction is a direction outward of the connector along the lateral direction of the connector, and is equivalent to a "second direction" in the present disclosure. The longitudinal direction Y of the connector is equivalent to a "third direction" in the present disclosure.

As shown in FIG. 1, the receptacle connector 2 mainly has terminals 10 and a housing 20 holding the terminals 10. Specifically, the receptacle connector 2 is configured such that the plurality of terminals 10 is arrayed at equal intervals along the longitudinal direction Y, and sets of the plurality of terminals 10 arrayed in the longitudinal direction Y are provided in two lines. The two sets of the plurality of terminals 10 arrayed in the longitudinal direction Y are provided with a clearance therebetween in the lateral direction X, specifically with first leg portions 11 of the terminals 10 facing each other through a second inner wall 25 of the housing 20. In other words, the receptacle connector 2 has the pair of sets of the plurality of terminals 10 symmetrically facing each other in the lateral direction X and arrayed along the longitudinal direction Y. The plurality of terminals 10 has the same substantially U-shape recessed in the lower direction Z2 (also see, e.g., FIG. 9 described later).

The receptacle connector 2 is formed, by integral molding, using conductive members forming the terminals 10 and made of, e.g., copper alloy and resin, such as liquid crystal polymer (LCP), forming the housing 20, for example. In a typical example, the terminals 10 are insert-molded in the housing 20.

The housing 20 of the receptacle connector 2 has a pair of first side walls 21 extending in the longitudinal direction Y and a pair of side walls 22 extending in the lateral direction X, and the first side walls 21 and the side walls 22 form an outer wall (peripheral wall) of the housing 20. Further, the housing 20 has first inner walls 24 and the second inner wall 25.

The first inner walls 24 extend in the lateral direction X, and are formed to separate the plurality of terminals 10 arrayed along the longitudinal direction Y from each other. More specifically, the housing 20 has the pairs of first inner walls 24. The pair of first inner walls 24 sandwiches, in the longitudinal direction Y, a portion of one terminal 10 on one direction side (X1-direction side) in the lateral direction X, and is provided apart from such a terminal 10. The second inner wall 25 of the housing 20 extends in the longitudinal direction Y to couple the pairs of first inner walls 24 to each other. Moreover, the second inner wall 25 is formed to separate the pair of sets of the terminals 10 symmetrically facing each other in the lateral direction X and arrayed along the longitudinal direction Y.

Figure 2:
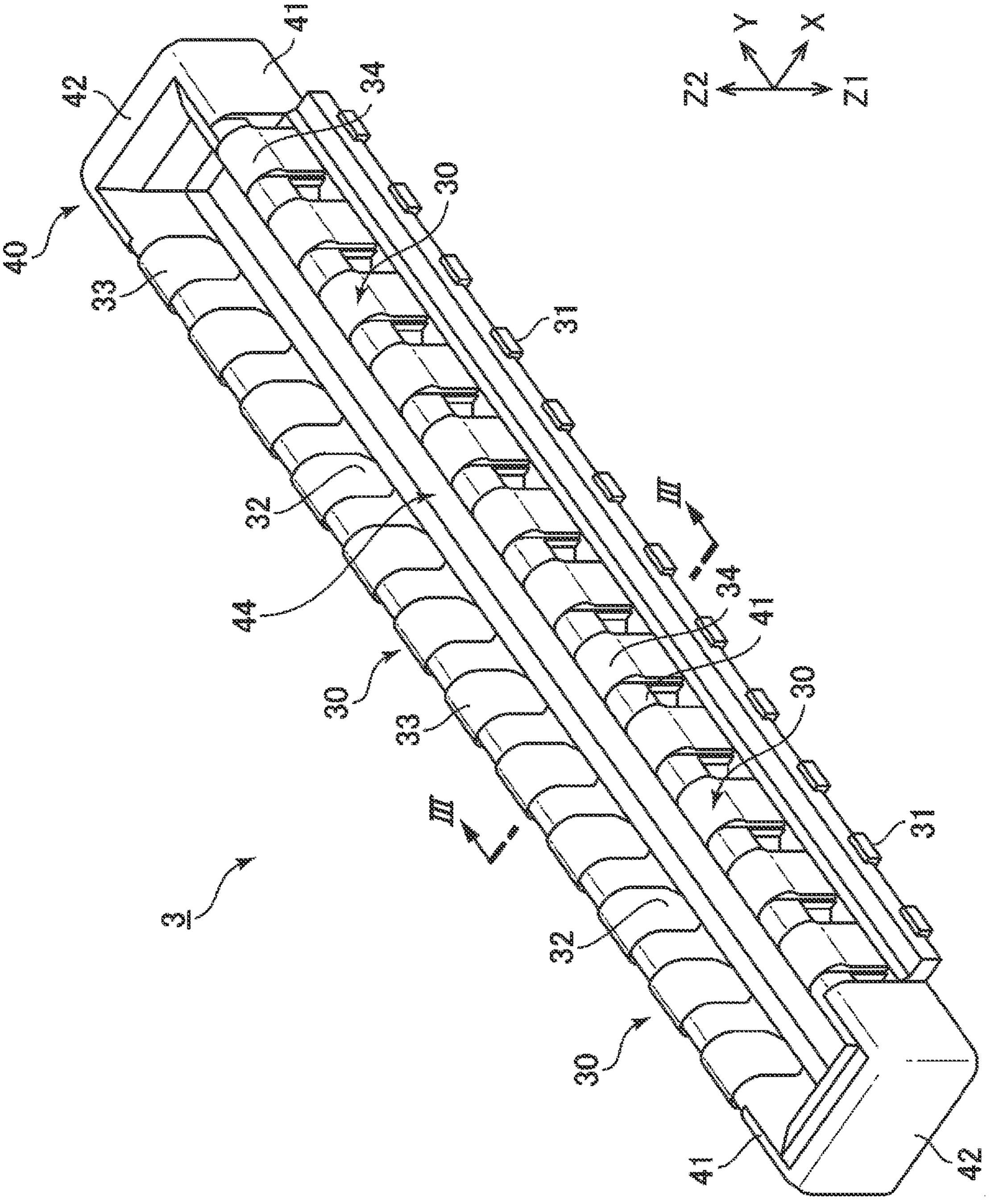
FIG. 2 is a perspective view of a plug connector according to the embodiment of the present disclosure.
Figure 3:
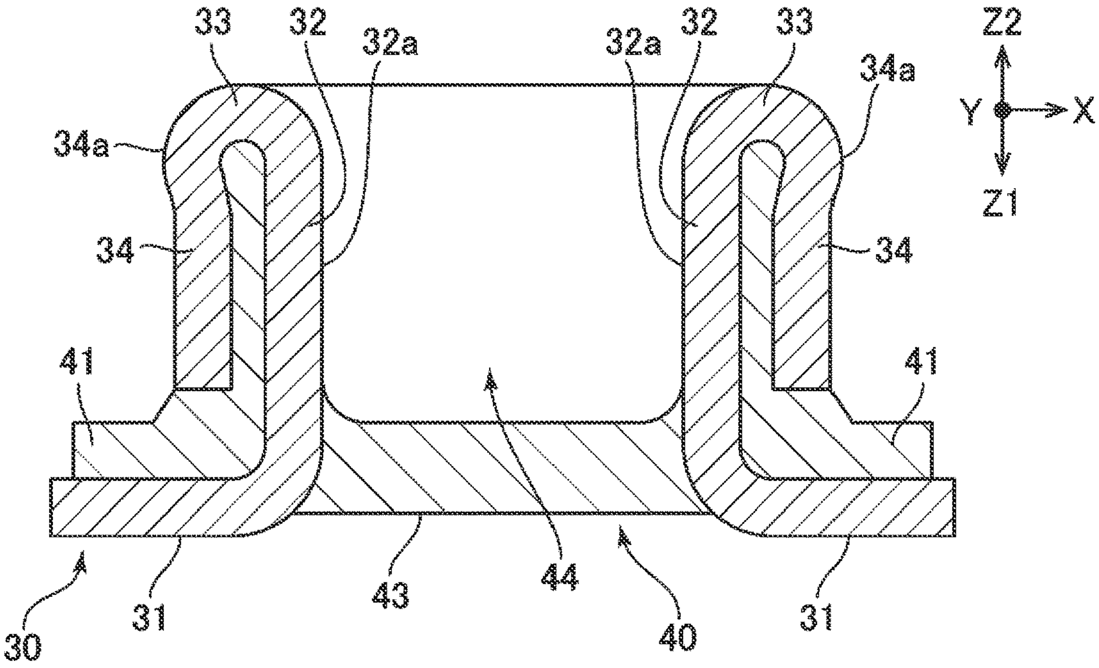
FIG. 3 is a sectional view of the plug connector according to the embodiment of the present disclosure along an III-III line in FIG. 2.

Next, in addition to FIG. 1, the plug connector 3 according to the present embodiment will be specifically described with reference to FIGS. 2 and 3. FIG. 2 is a perspective view of the plug connector 3 according to the present embodiment diagonally from above, and FIG. 3 is a sectional view of the plug connector 3 according to the present embodiment along an III-III line in FIG. 2.

As shown in FIGS. 1 and 2, the plug connector 3 mainly has terminals 30 and a housing 40 holding the terminals 30. Specifically, as shown in FIG. 2, the plug connector 3 is configured such that the plurality of terminals 30 is arrayed at equal intervals along the longitudinal direction Y, and sets of the plurality of terminals 30 arrayed in the longitudinal direction Y are provided in two lines. The sets of the plurality of terminals 30 arrayed in the longitudinal direction Y are provided so as to face each other through a fitting recessed portion 44 with a clearance therebetween in the lateral direction X. In other words, the plug connector 3 has the pair of sets of the plurality of terminals 30 symmetrically facing each other in the lateral direction X and arrayed along the longitudinal direction Y. All the terminals 30 have the same substantially inverted U-shape protruding in the upper direction Z2 (also see FIG. 3).

The plug connector 3 is formed, by integral molding, using conductive members forming the terminals 30 and made of, e.g., copper alloy and resin, such as liquid crystal polymer (LCP), forming the housing 40, for example. In a typical example, the terminals 30 are insert-molded in the housing 40.

As shown in FIG. 2, the housing 40 of the plug connector 3 has a pair of first side walls 41 extending in the longitudinal direction Y and a pair of side walls 42 extending in the lateral direction X, and the first side walls 41 and the side walls 42 form an outer wall (peripheral wall) of the housing 40. Next, as shown in FIG. 3, the terminal 30 of the plug connector 3 is formed with held in the first side wall 41 of the housing 40, and mainly has a mount portion 31, a first leg portion 32, a top portion 33, and a second leg portion 34. The mount portion 31 is a portion exposed through the lower surface of the plug connector 3 and provided for connecting the terminal 30 to the board by soldering. Specifically, the mount portion 31 slightly protrudes in the lower direction Z1 with respect to a bottom wall 43 of the housing 40 (also see FIGS. 1 and 2). The first leg portion 32 is coupled to the mount portion 31, extends in the upper direction Z2 from the mount portion 31, and is coupled to the top portion 33. The second leg portion 34 is coupled to the top portion 33, and extends in the lower direction Z1 from the top portion 33.

When the plug connector 3 is fitted to the receptacle connector 2, the first leg portion 32, top portion 33, and second leg portion 34 of each terminal 30 of the plug connector 3 are inserted into a later-described fitting recessed portion 16 of a corresponding one of the terminals 10 of the receptacle connector 2. In addition, part of each terminal 10 of the receptacle connector 2 and the first inner walls 24 and second inner wall 25 of the housing 20 are inserted into the fitting recessed portion 44 of the plug connector 3. At this time, a contact portion 32*a* of the first leg portion 32 and a contact portion 34*a* of the second leg portion 34 in each terminal 30 of the plug connector 3 contact a corresponding one of the terminals 10 of the receptacle connector 2, and accordingly, electric connection between the terminals 10 of the receptacle connector 2 and the terminals 30 of the plug connector 3 is made. The contact portions 32*a*, 34*a* are surface portions of the first leg portion 32 and the second leg portion 34 opposite to the side contacting the first side wall 41.

Figure 4:
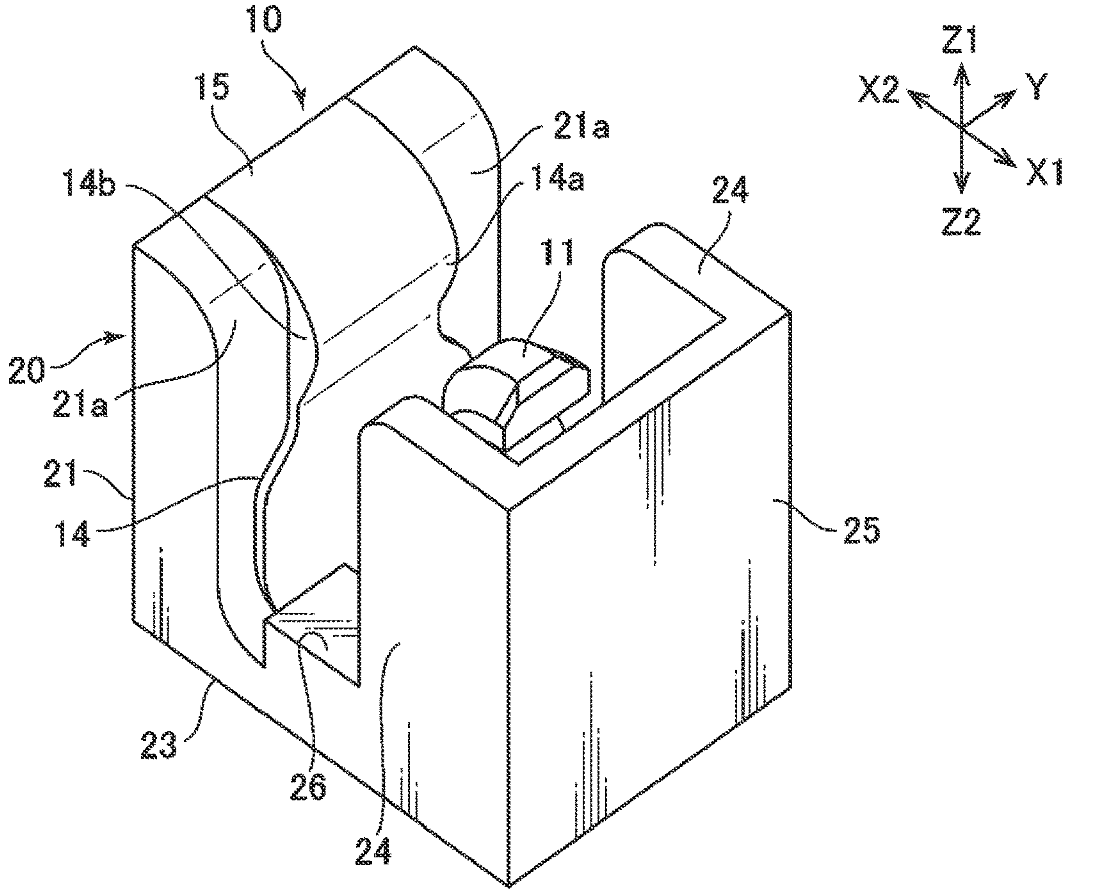
FIG. 4 is a perspective view of part of a receptacle connector according to the embodiment of the present disclosure.
Figure 5:
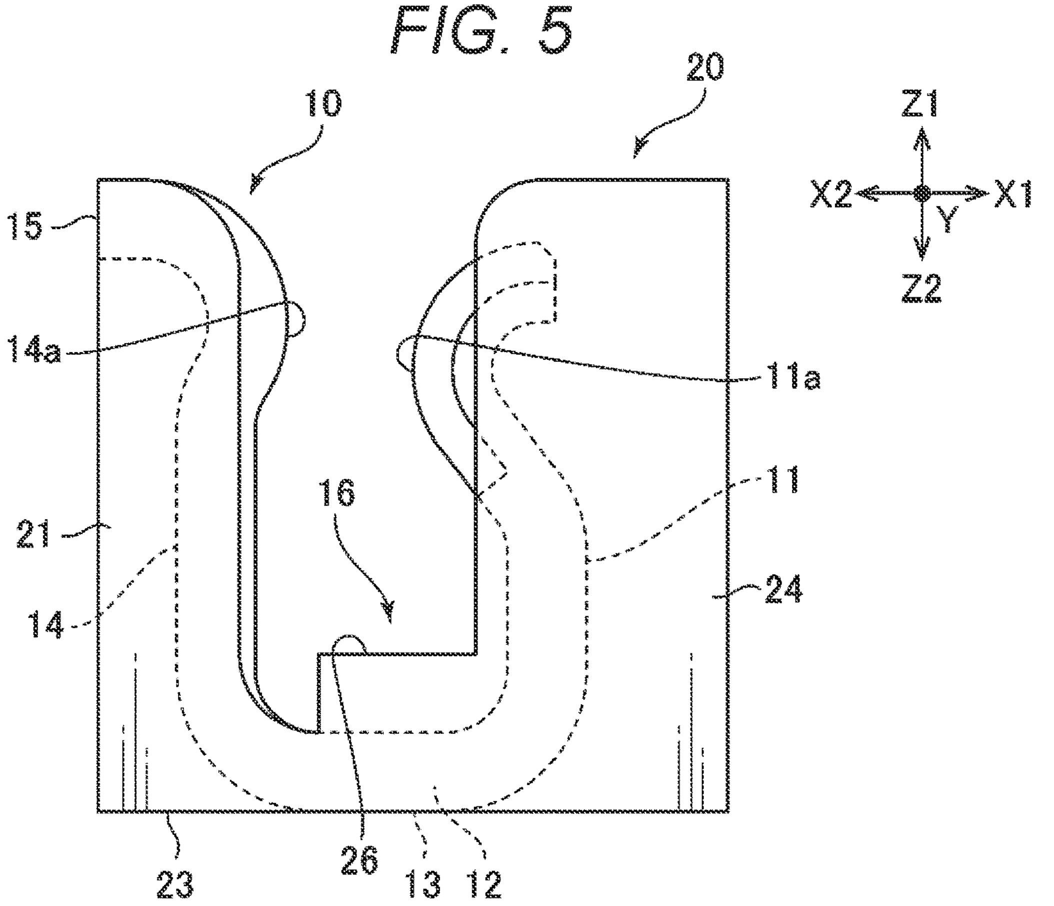
FIG. 5 is a side view of the part of the receptacle connector according to the embodiment of the present disclosure.
Figure 6:
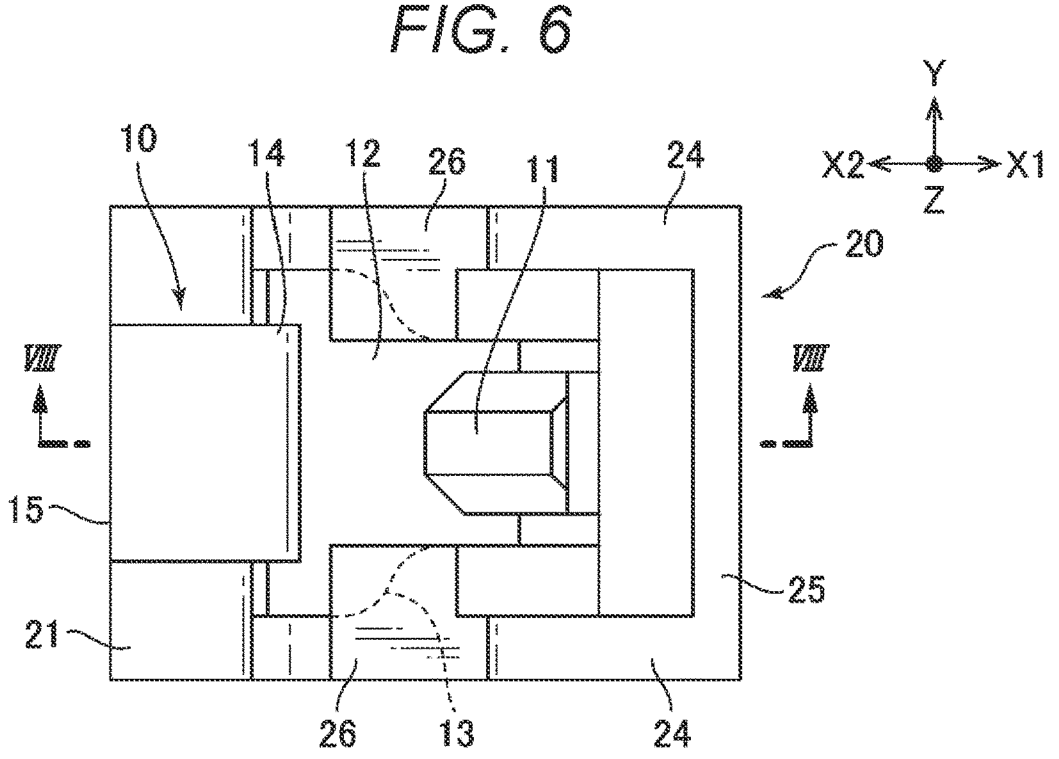
FIG. 6 is a top view of the part of the receptacle connector according to the embodiment of the present disclosure.
Figure 7:
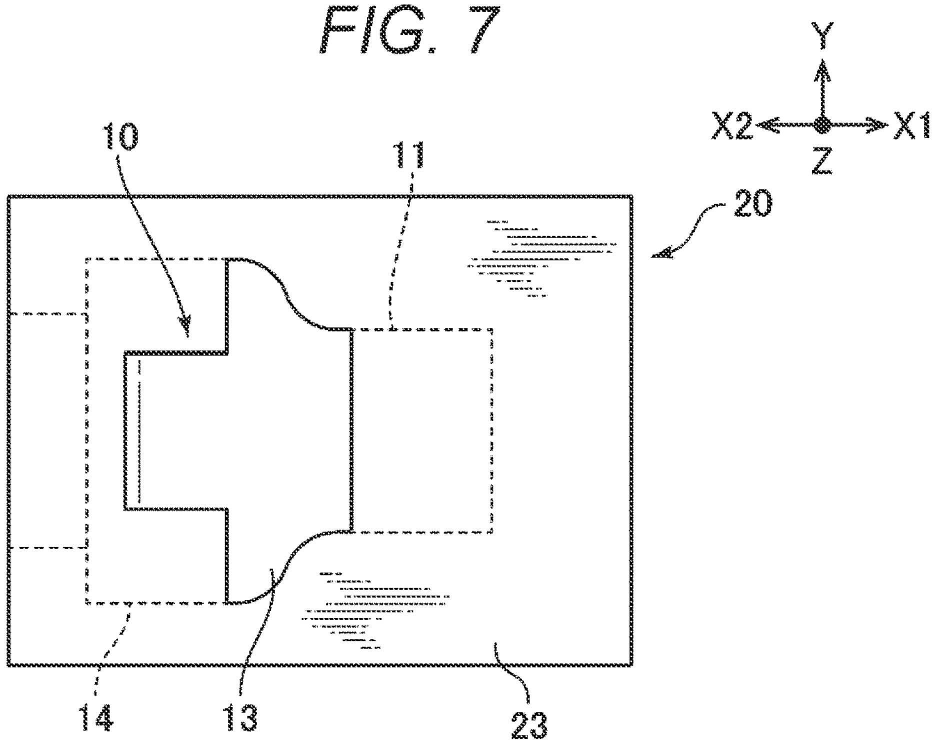
FIG. 7 is a bottom view of the part of the receptacle connector according to the embodiment of the present disclosure.
Figure 8:
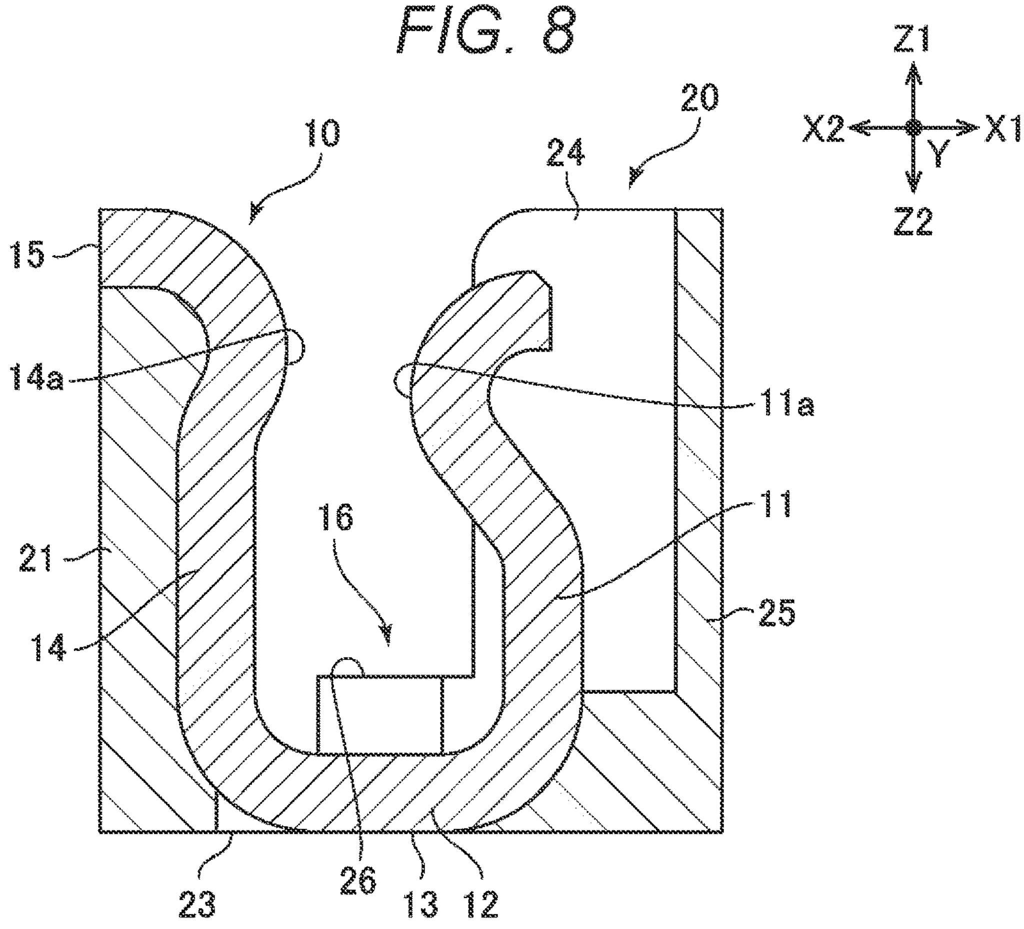
FIG. 8 is a sectional view of the part of the receptacle connector according to the embodiment of the present disclosure along a VIII-VIII line in FIG. 6.
Figure 9:
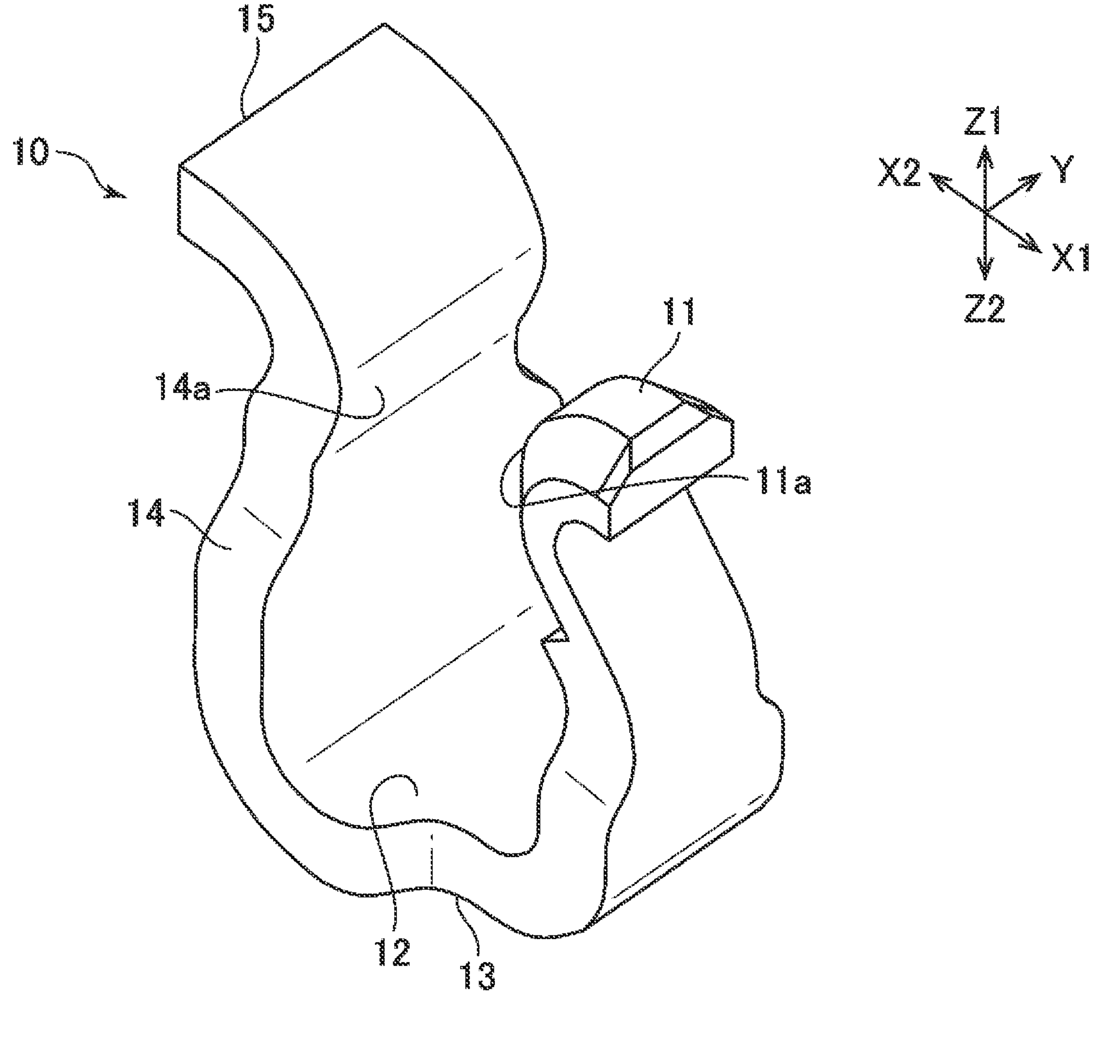
FIG. 9 is a perspective view of one terminal of the plug connector according to the embodiment of the present disclosure.

Next, the receptacle connector 2 according to the present embodiment will be specifically described with reference to FIGS. 4 to 9. FIGS. 4 to 8 are views showing part of the receptacle connector 2 according to the present embodiment, specifically one terminal 10 and a portion of the housing 20 therearound. FIG. 4 shows a perspective view diagonally from above, FIG. 5 shows a side view along the longitudinal direction Y, FIG. 6 shows a top view as viewed in the fitting direction Z (specifically, lower direction Z2), FIG. 7 shows a bottom view as viewed in the fitting direction Z (specifically, upper direction Z1), and FIG. 8 shows a sectional view along a VIII-VIII line in FIG. 6. Note that FIGS. 5, 6, and 7 partially show the components in a see-through state. Moreover, FIG. 9 is a perspective view of only one terminal 10 of the receptacle connector 2 according to the present embodiment diagonally from above.

As shown in FIGS. 4, 5, 8, and 9, the terminal 10 of the receptacle connector 2 has a bottom portion 12 with a mount portion 13, which is to be mounted on the board, at the lower surface, the first leg portion 11, and a second leg portion 14.

The first leg portion 11 extends in the upper direction Z1 of the fitting direction Z from the X1-direction side of the bottom portion 12 in the lateral direction X, and is elastically deformable in the X1-direction. The second leg portion 14 extends in the upper direction Z1 of the fitting direction Z from the X2-direction side, which is opposite to the X1-direction side, of the bottom portion 12, and is elastically deformable in the X2-direction. In the present embodiment, the first leg portion 11 extends in the fitting direction Z from an end portion of the bottom portion 12 on the X1-direction side, and the second leg portion 14 extends in the fitting direction Z from an end portion of the bottom portion 12 on the X2-direction side.

The X1-direction is equivalent to the "first direction" in the present disclosure, and is equivalent to a direction from the outside to the inside of the receptacle connector 2, specifically a direction from the terminal 10 to the second inner wall 25 side of the housing 20. The X2-direction is equivalent to the "second direction" in the present disclosure, and is equivalent to a direction from the inside to the outside of the receptacle connector 2, specifically a direction from the terminal 10 to the first side wall 21 side of the housing 20.

In the present embodiment, the first leg portion 11 is not held in the housing 20, but the bottom portion 12 and second leg portion 14 of the terminal 10 are held in the housing 20 (see FIGS. 4, 5, and 8). Specifically, the bottom portion 12 is held in a bottom wall 23 of the housing 20, and the second leg portion 14 is held in the first side wall 21 of the housing 20. In this case, both side surfaces of the second leg portion 14 in the longitudinal direction Y and the back surface of the second leg portion 14 in the X2-direction side contact the first side wall 21 of the housing 20 (see FIG. 4). Both side surfaces of the second leg portion 14 in the longitudinal direction Y are equivalent to cut surfaces of a metal plate forming the terminal 10. The back surface of the second leg portion 14 in the X2-direction side is a surface opposite to a later-described contact portion 14*a*.

More specifically, as shown in FIG. 4, the second leg portion 14 is configured such that portions 14*b* of both side surfaces of the contact portion 14*a* in the longitudinal direction Y are exposed through portions 21*a* of the first side wall 21 of the housing 20 sandwiching both side surfaces of the contact portion 14*a*. The length of the second leg portion 14 along the longitudinal direction Y increases in the lower direction Z2 from the contact portion 14*a* (also see FIG. 9). That is, the width of the second leg portion 14 increases in the lower direction Z2 from the contact portion 14*a*. Part of side surfaces of the width-increasing portion of the second leg portion 14 is also exposed through the first side wall 21 of the housing 20 (also see FIG. 5). The portions of the second leg portion 14 of the terminal 10 exposed through the first side wall 21 of the housing 20 as described above are used for holding the terminal 10 on a mold in insert molding.

An end portion 15 of the second leg portion 14 of the terminal 10 on the upper direction Z1 side and the X2-direction side is a portion (in other words, lead cut portion, carrier connection portion) cut from a not-shown carrier, and is positioned uppermost in the terminal 10 (see FIGS. 5, 8, and 9).

Further, the terminal 10 is formed such that the length of the second leg portion 14 along the longitudinal direction Y is longer than the length of the first leg portion 11 along the longitudinal direction Y (see FIG. 9). That is, the width of the second leg portion 14 is formed wider than the width of the first leg portion 11. The width of the bottom portion 12 is the same as the width of the first leg portion 11 at an end portion of the bottom portion 12 on the first direction X1 side, and is the same as the width of the second leg portion 14 at an end portion of the bottom portion 12 on the second direction X2 side. Moreover, the width of the bottom portion 12 increases from the first direction X1 side to the second direction X2 side. The length (width) of the bottom portion 12 in the longitudinal direction Y is changed as described above, and accordingly, there is a difference in the length (width) in the longitudinal direction Y between the first leg portion 11 and the second leg portion 14 (see FIGS. 7 and 9).

Further, the housing 20 of the receptacle connector 2 has the pairs of first inner walls 24, each of which extends in the lateral direction X so as to sandwich the first leg portion 11 of the terminal 10 from both sides thereof in the longitudinal direction Y and is provided apart from the first leg portion 11 (see FIG. 4). In addition, the housing 20 has the second inner wall 25 extending in the longitudinal direction Y so as to face the first leg portions 11 of the terminals 10 in the X1-direction and coupling the pairs of first inner walls 24 to each other. As in the first inner wall 24, the second inner wall 25 is provided apart from the first leg portions 11 of the terminals 10.

The terminal 10 includes the fitting recessed portion 16 formed by the first leg portion 11, the bottom portion 12, and the second leg portion 14. The fitting recessed portion 16 has a substantially U-shape recessed in the lower direction Z2 and opened on the upper direction Z1 side (see FIGS. 5 and 8). When the receptacle connector 2 is fitted to the plug connector 3, the first leg portion 32, top portion 33, and second leg portion 34 of each terminal 30 of the plug connector 3 (see FIG. 3) are inserted into the fitting recessed portion 16 of a corresponding one of the terminals 10. At this time, a contact portion 11*a* of the first leg portion 11 and the contact portion 14*a* of the second leg portion 14 in the terminal 10 of the receptacle connector 2 contact the terminal 30 of the plug connector 3, and accordingly, electric connection between the terminals 10 of the receptacle connector 2 and the terminals 30 of the plug connector 3 is made. The contact portions 11*a*, 14*a* are surface portions of the first leg portion 11 and the second leg portion 14 on the fitting recessed portion 16 side.

As described above, the first side wall 21 of the housing 20 contacts the surface of the second leg portion 14 of each terminal 10 on the X2-direction side, and is made of resin. Thus, the first side wall 21 of the housing 20 is elastically deformable in the lateral direction X together with the second leg portions 14 of the terminals 10. Specifically, when each terminal 30 of the plug connector 3 is inserted into the fitting recessed portion 16 of a corresponding one of the terminals 10 of the receptacle connector 2, both the second leg portions 14 of the terminals 10 and the first side walls 21 of the housing 20 in the receptacle connector 2 are elastically deformed together in the X2-direction in synchronization with each other.

Note that the length of the first side wall 21 in the lateral direction X and the length of the first side wall 21 in the fitting direction Z may be designed as necessary such that the first side wall 21 of the housing 20 is elastically deformable in a desired manner, i.e., a contact pressure within a predetermined range is provided from the first side wall 21 and the second leg portion 14 of the terminal 10 to the terminal 30 of the plug connector 3. In this case, the first side wall 21 may be further formed with a slit which extends in the lower direction Z2 from an upper end portion of the first side wall 21 such that the first side wall 21 is elastically deformable in a desired manner. Such a slit may be formed, for example, in a portion of the first side wall 21 between adjacent ones of the second leg portions 14 of the plurality of terminals 10.

As shown in FIGS. 7 and 8, the mount portion 13 of the terminal 10 of the receptacle connector 2 is exposed through the lower surface of the receptacle connector 2, and is used for connecting the terminal 10 to the board by soldering. As described above, the mount portion 13 is formed by the lower surface of the bottom portion 12 of the terminal 10. Moreover, in the receptacle connector 2, the surface of the mount portion 13 of the terminal 10 and the bottom surface (i.e., the lower surface of the bottom wall 23) of the housing 20 are flush with each other (particularly see FIG. 8).

Next, as shown in FIGS. 4, 5, 6, and 8, the housing 20 has cover portions 26 provided to cover portions of the bottom portion 12 of each terminal 10 opposite to the mount portion 13, i.e., the upper surface of the bottom portion 12. Specifically, the housing 20 has, for each terminal 10, two separated cover portions 26 that cover at least two portions corresponding to boundaries (joint lines) between the bottom portion 12 of the terminal 10 and the bottom wall 23 of the housing 20 (particularly see FIG. 6). These cover portions 26 reduce leakage of solder provided to the back mount portion 13 of the terminal 10 to the front side. Note that the cover portions 26 are not limited to use of the two separated cover portions 26 and one coupled cover portion 26 may be used.

Figure 10:
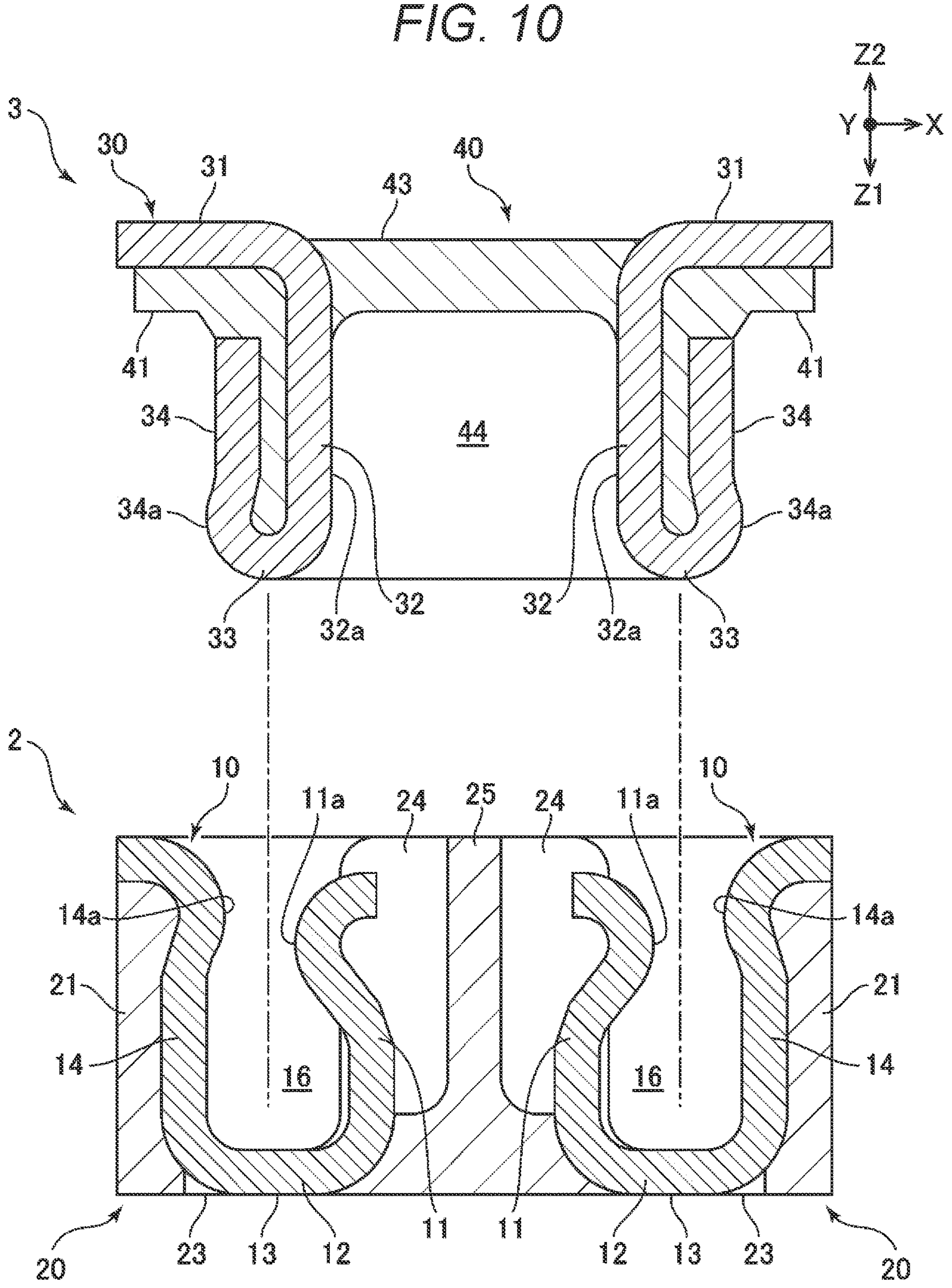
FIG. 10 is a sectional view showing the state of the connector assembly according to the embodiment of the present disclosure before fitting.
Figure 11:
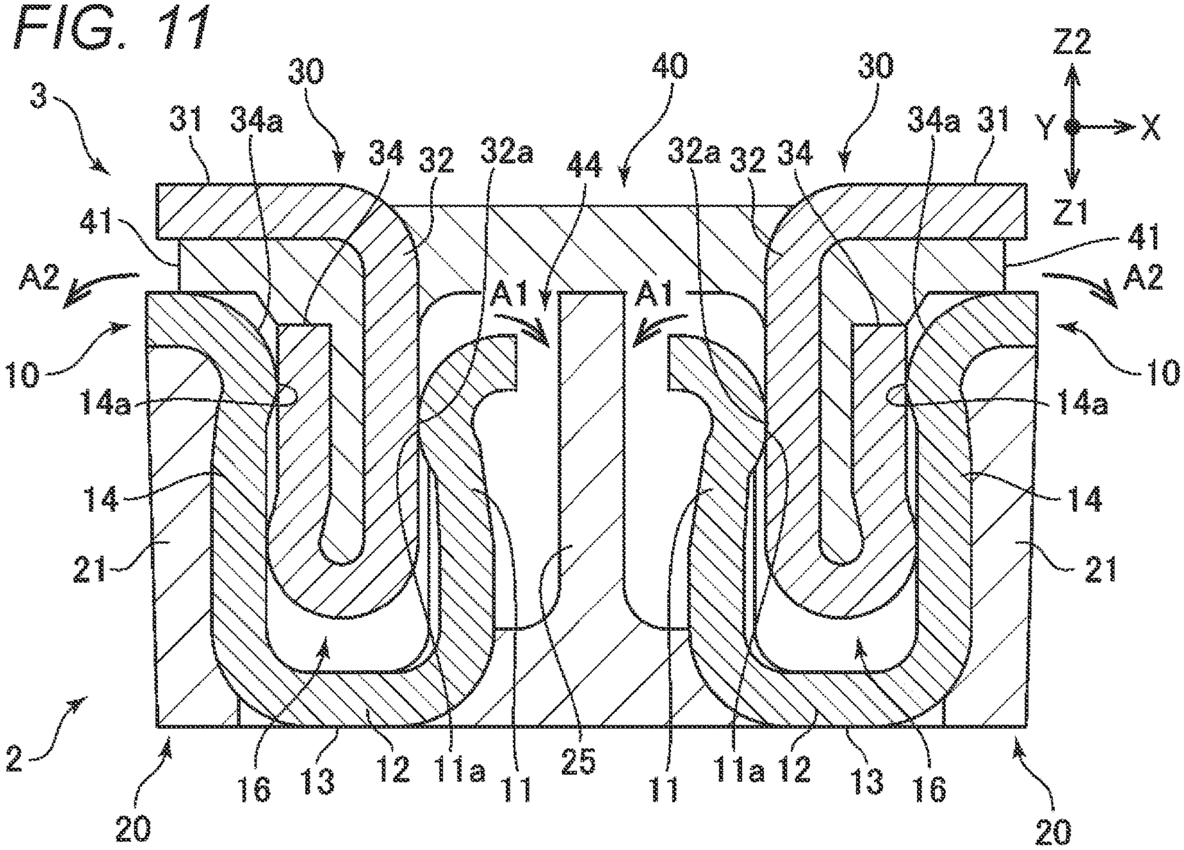
FIG. 11 is a sectional view showing the state of the connector assembly according to the embodiment of the present disclosure after fitting.

Next, fitting of the receptacle connector 2 and the plug connector 3 will be described with reference to FIGS. 10 and 11. FIG. 10 is a sectional view of the connectors 2, 3 (connector assembly 1) before fitting as viewed in the longitudinal direction Y, and FIG. 11 is a sectional view of the connectors 2, 3 (connector assembly 1) after fitting as viewed in the longitudinal direction Y. As shown in FIGS. 10 and 11, when the connectors 2, 3 are fitted to each other, the first leg portion 32, top portion 33, and second leg portion 34 of each terminal 30 of the plug connector 3 are inserted into the fitting recessed portion 16 of a corresponding one of the terminals 10 of the receptacle connector 2. In addition, the first leg portion 11 of each terminal 10 and the first inner walls 24 and second inner wall 25 of the housing 20 in the receptacle connector 2 are inserted into the fitting recessed portion 44 of the plug connector 3. Note that in order to implement such fitting, the fitting recessed portion 16 of the receptacle connector 2 is formed with such a size that the fitting recessed portion 16 can properly house the first leg portion 32, top portion 33, and second leg portion 34 of the plug connector 3, and the fitting recessed portion 44 of the plug connector 3 is formed with such a size that the fitting recessed portion 44 can properly house the first leg portions 11, first inner walls 24, and second inner wall 25 of the receptacle connector 2.

Upon fitting of the connectors 2, 3, the first leg portion 11 of each terminal 10 of the receptacle connector 2 is pressed by the first leg portion 32 of a corresponding one of the terminals 30 of the plug connector 3, and is deformed in the lateral direction X (specifically, X1-direction) as indicated by an arrow A1, as illustrated in FIG. 11. In addition, the second leg portion 14 of each terminal 10 of the receptacle connector 2 is pressed by the second leg portion 34 of a corresponding one of the terminals 30 of the plug connector 3, and is deformed in the lateral direction X (specifically, X2-direction) as indicated by an arrow A2. In this case, the first side walls 21 of the housing 20 of the receptacle connector 2 are pressed by the second leg portions 14 contacting the first side walls 21, and are deformed in the lateral direction X as indicated by the arrows A2. That is, both the second leg portions 14 of the terminals 10 and the first side walls 21 of the housing 20 in the receptacle connector 2 are deformed together in the lateral direction X in synchronization with each other.

In such a fitting state, each terminal 30 of the plug connector 3 is pressed in the lateral direction X (specifically, X2-direction) by force of the first leg portions 11 of the terminals 10 of the receptacle connector 2 returning to an original shape, and is pressed in the lateral direction X (specifically, X1-direction) by force of the second leg portions 14 of the terminals 10 and the first side walls 21 of the housing 20 in the receptacle connector 2 returning to original shapes. Accordingly, electric connection between the terminals 10 of the receptacle connector 2 and the terminals 30 of the plug connector 3 is ensured. In this case, the contact portion 11*a* of the first leg portion 11 and the contact portion 14*a* of the second leg portion 14 in each terminal 10 of the receptacle connector 2 contact the contact portion 32*a* of the first leg portion 32 and the contact portion 34*a* of the second leg portion 34 in a corresponding one of the terminals 30 of the plug connector 3. Note that the contact areas of at least any one or more of the contact portions 11*a*, 14*a*, 32*a*, 34*a* are decreased so that reliability in such a contact state can be improved.

[Features and Effects]

Next, features and effects of the receptacle connector 2 according to the above-described present embodiment will be described.

The terminal 10 of the receptacle connector 2 according to the present embodiment has the bottom portion 12 including the mount portion 13 to be mounted on, e.g., the board, the first leg portion 11 coupled to the bottom portion 12 on the X1-direction side, extending in the upper direction Z1 from the bottom portion 12, and formed elastically deformable in the X1-direction, and the second leg portion 14 coupled to the bottom portion 12 on the X2-direction side, extending in the upper direction Z1 from the bottom portion 12, and formed elastically deformable in the X2-direction. The terminal 10 is configured such that the terminal 30 of the plug connector 3 is housed in the fitting recessed portion 16 formed by the bottom portion 12, the first leg portion 11, and the second leg portion 14 and the first leg portion 11 and the second leg portion 14 contact the terminal 30 of the plug connector 3 when the terminal 30 of the plug connector 3 is housed in the fitting recessed portion 16. The housing 20 has the first side walls 21 extending in the fitting direction Z and contacting the second leg portions 14 of the terminals 10. Both the second leg portions 14 of the terminals 10 and the first side walls 21 of the housing 20 are elastically deformable in the X2-direction when each terminal 30 of the plug connector 3 is inserted into the fitting recessed portion 16 of a corresponding one of the terminals 10.

According to the receptacle connector 2 of the present embodiment as described above, when each terminal 30 of the plug connector 3 is inserted into the fitting recessed portion 16 of a corresponding one of the terminals 10, the first leg portion 11 of the terminal 10 is elastically deformed in the lateral direction X (specifically, X1-direction), and both the second leg portions 14 of the terminals 10 and the first side walls 21 of the housing 20 are elastically deformed together in the lateral direction X (specifically, X2-direction) in synchronization with each other. With this configuration, elastic force is generated from the first leg portions 11 of the terminals 10 and from both the second leg portions 14 of the terminals 10 and the first side walls 21 of the housing 20, and therefore, sufficient contact pressure can be provided to the terminals 30 of the plug connector 3. In other words, the contact pressure provided to the terminals 30 of the plug connector 3 can be intensified. Thus, even if the receptacle connector 2 is reduced in size, the contact pressure provided to the terminals 30 of the plug connector 3 can be properly ensured. Consequently, for example, even if the connectors 2, 3 are repeatedly detached and attached, sufficient contact pressure can be continuously provided, and electric connection between the terminals 10, 30 of the connectors 2, 3 can be ensured.

In the receptacle connector 2 according to the present embodiment, the housing 20 has the cover portions 26 covering the portions of the bottom portion 12 of each terminal 10 opposite (upper side) to the mount portion 13. According to the cover portions 26 of the housing 20 as described above, leakage of the solder provided to the back mount portion 13 of the terminal 10 to the front side (e.g., the first leg portion 11 and the second leg portion 14) can be reduced.

The receptacle connector 2 according to the present embodiment has the plurality of terminals 10 arrayed along the longitudinal direction Y. The housing 20 has the pairs of first inner walls 24, each of which extends in the X1-direction from the portions corresponding to the first leg portion 11 of the terminal 10 and formed apart from the first leg portion 11 so as to sandwich the first leg portion 11 in the longitudinal direction Y. According to the first inner walls 24 of the housing 20, even if the first leg portion 11 is deformed in the longitudinal direction Y due to insertion of the terminal 30 of the plug connector 3, the first leg portion 11 contacts the first inner wall 24 so that further displacement of the first leg portion 11 in the longitudinal direction Y can be reduced. Thus, contact of the first leg portion 11 displaced in the longitudinal direction Y due to insertion of the terminal 30 of the plug connector 3 with the first leg portion 11 of another terminal 10 adjacent thereto in the longitudinal direction Y can be reduced.

The receptacle connector 2 according to the present embodiment has the pair of sets of the plurality of terminals 10 arrayed so as to symmetrically face each other in the X1-direction. The housing 20 further has the second inner wall 25 formed so as to extend in the longitudinal direction Y and face the first leg portions 11 of the terminals 10 in the X1-direction. According to the second inner wall 25 of the housing 20 as described above, even if the first leg portion 11 is greatly displaced in the X1-direction due to insertion of the terminal 30 of the plug connector 3, the first leg portion 11 contacts the second inner wall 25 so that further displacement of the first leg portion 11 in the X1-direction can be reduced. Thus, contact of the first leg portion 11 greatly displaced in the X1-direction due to insertion of the terminal 30 of the plug connector 3 with the first leg portion 11 of another terminal 10 adjacent thereto in the X1-direction can be reduced.

In the receptacle connector 2 according to the present embodiment, the terminal 10 is formed such that the length of the second leg portion 14 in the longitudinal direction Y is longer than the length of the first leg portion 11 in the longitudinal direction Y. As described above, the length of the second leg portion 14, which is held in the housing 20 (i.e., contacts the first side wall 21 of the housing 20), in the longitudinal direction Y is longer than the length of the first leg portion 11, which is not held in the housing 20, in the longitudinal direction Y so that the elastic force on the second leg portion 14 side can be effectively intensified. Thus, the contact pressure provided from the receptacle connector 2 to the plug connector 3 can be more effectively ensured.

[Modifications]

Next, modifications of the above-described embodiment will be described.

In the above-described embodiment, the example where the first leg portion 11 of the terminal 10 is not held in the housing 20 and the second leg portion 14 of the terminal 10 is held in the housing 20 in the receptacle connector 2 has been described. Specifically, in the above-described embodiment, the second leg portion 14 contacts the first side wall 21 of the housing 20, and the second leg portion 14 and the first side wall 21 are elastically deformed together. As a first modification, the second leg portion 14 of the terminal 10 may not be held in the housing 20, but the first leg portion 11 of the terminal 10 may be held in the housing 20. Specifically, a side wall of the housing 20 with which the first leg portions 11 contact may be provided, and the first leg portions 11 and the side wall may be elastically deformed together.

As a second modification, both the first leg portion 11 and second leg portion 14 of each terminal 10 may be held in the housing 20. Specifically, side walls of the housing 20 with which the first leg portions 11 and the second leg portions 14 contact may be provided, the first leg portions 11 and the side wall of the housing 20 contacting therewith and the second leg portions 14 and the side wall of the housing 20 contacting therewith may be elastically deformed together. The second modification as described above will be specifically described with reference to FIGS. 12 and 13.

Figure 12:
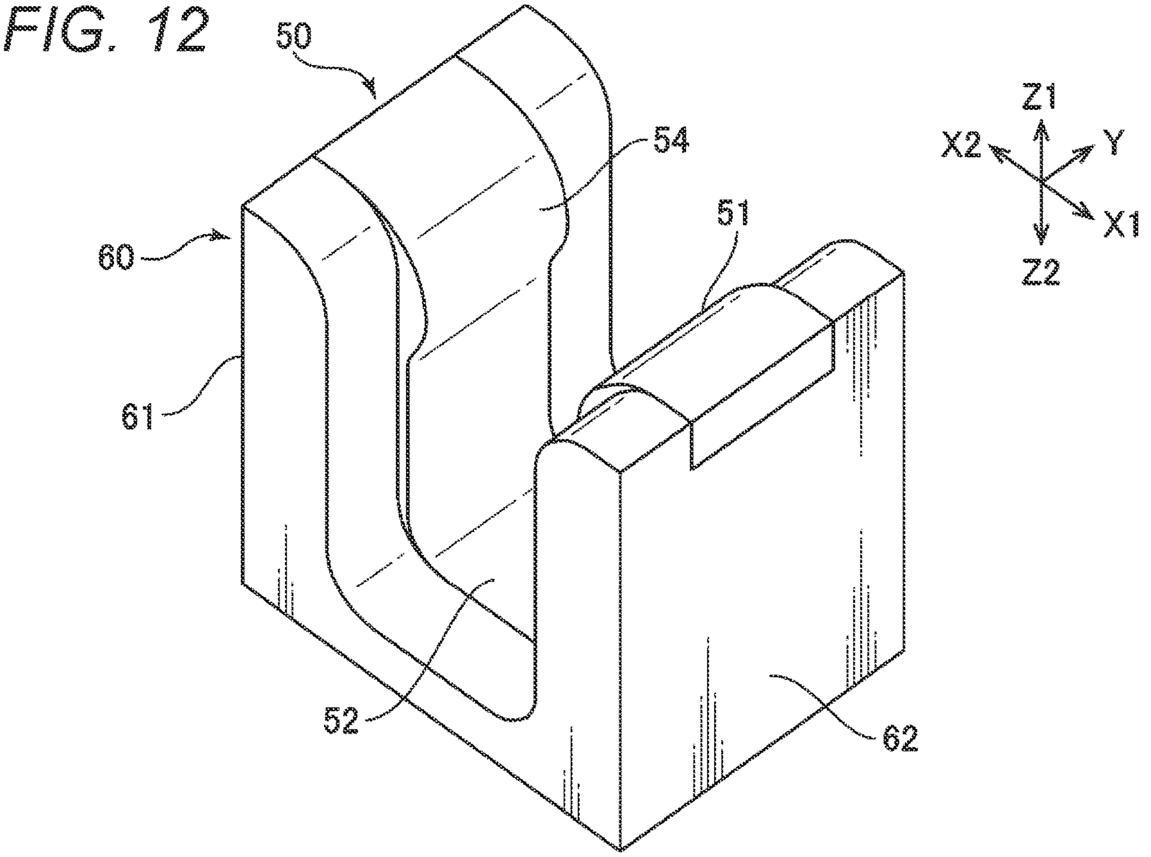
FIG. 12 is a perspective view of part of a receptacle connector according to a second modification of the embodiment of the present disclosure.
Figure 13:
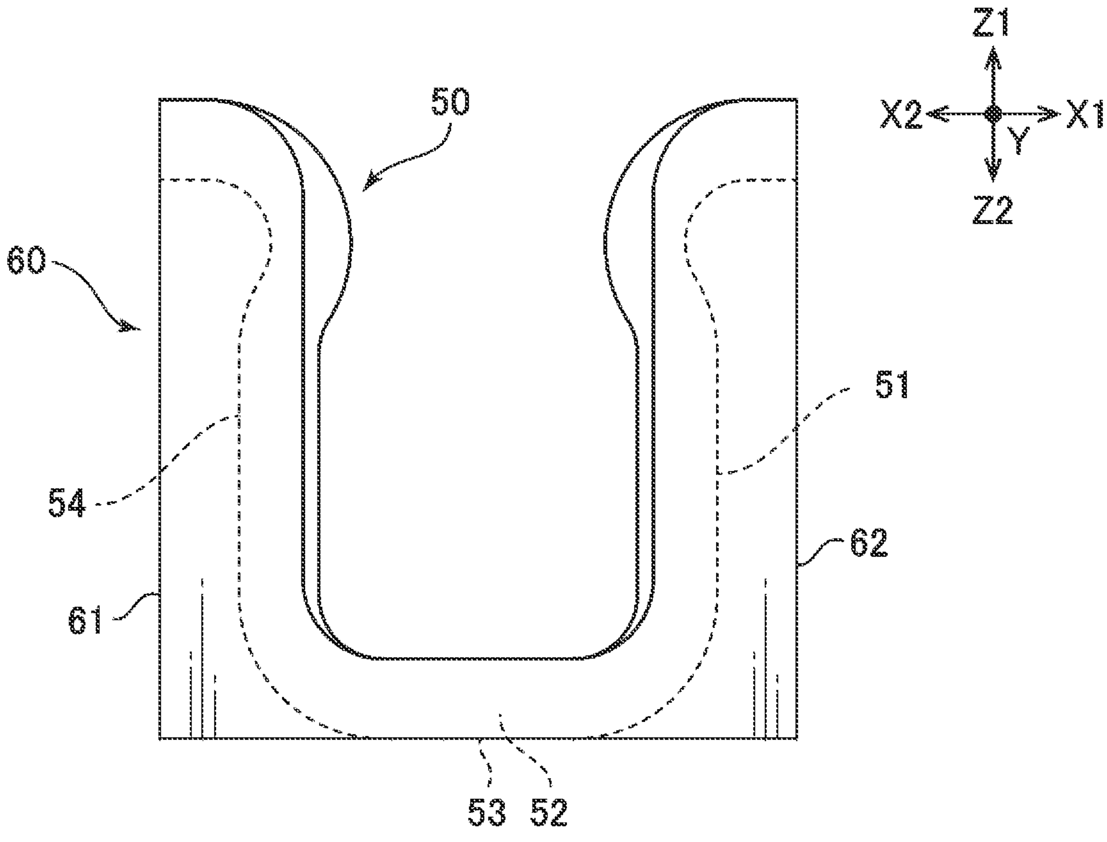
FIG. 13 is a side view of the part of the receptacle connector according to the second modification of the embodiment of the present disclosure.

FIGS. 12 and 13 show part of a receptacle connector according to the second modification, specifically one terminal 50 and a portion of a housing 60 therearound. FIG. 12 is a perspective view diagonally from above, and FIG. 13 is a side view (partially shown in a see-through state) as viewed in the longitudinal direction Y. As shown in FIGS. 12 and 13, in the receptacle connector according to the present modification, the terminal 50 has a bottom portion 52 with a mount portion 53, which is to be mounted on a board, at the lower surface, a first leg portion 51 coupled to the bottom portion 52 on the X1-direction side, extending in the upper direction Z1 from the bottom portion 52, and formed elastically deformable in the X1-direction, and a second leg portion 54 coupled to the bottom portion 52 on the X2-direction side, extending in the upper direction Z1 from the bottom portion 52, and formed elastically deformable in the X2-direction.

Further, in the receptacle connector, the housing 60 has a second side wall 62 contacting the first leg portion 51 of the terminal 50 in addition to a first side wall 61 contacting the second leg portion 54 of the terminal 50. With this configuration, when a plug connector is inserted into the receptacle connector, the second leg portion 54 of the terminal 50 and the first side wall 61 of the housing 60 are elastically deformed together in the X2-direction, and the first leg portion 51 of the terminal 50 and the second side wall 62 of the housing 60 are elastically deformed together in the X1-direction.

According to the present modification, elastic force is generated from both the first leg portion 51 of the terminal 50 and the second side wall 62 of the housing 60 and from both the second leg portion 54 of the terminal 50 and the first side wall 61 of the housing 60 so that sufficient contact pressure can be provided to the terminal of the plug connector, i.e., the contact pressure to be provided can be effectively intensified. Thus, even if the receptacle connector is reduced in size, the contact pressure provided to the plug connector can be more effectively ensured.

Note that in the present modification, the lengths of the first side wall 61 and the second side wall 62 in the lateral direction X and the lengths of the first side wall 61 and the second side wall 62 in the fitting direction Z may be designed as necessary such that both the first side wall 61 and second side wall 62 of the housing 60 are elastically deformable in a desired manner, i.e., a contact pressure within a predetermined range is provided from not only the first side wall 61 and the second side wall 62 but also the first leg portion 51 and second leg portion 54 of the terminal 50 to the terminal of the plug connector.

In the above-described embodiment, the example where the receptacle connector 2 is formed by integral molding (insert molding) has been described. However, the receptacle connector 2 may be formed by press-fitting.

Note that the above-described embodiments are examples for describing the present disclosure and the present disclosure is not limited to these embodiments. The present disclosure can be implemented in various forms without departing from the gist of the present disclosure.

The electric connector according to the present disclosure can be used for the purpose of, e.g., connecting boards to each other via a flat cable in an electronic device that transmits an electric signal at high speed, such as a smartphone or a mobile phone.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electric connector comprising:

a terminal; and a housing holding the terminal, wherein the terminal has a bottom portion, a first leg portion, a second leg portion, and a mount portion, the mount portion is provided at a lower surface of the bottom portion, the housing has a first side wall, the first leg portion extends in a fitting direction of fitting to a partner connector from a first direction side of the bottom portion, and is elastically deformable in a first direction, the second leg portion extends in the fitting direction from a second direction side of the bottom portion opposite to the first direction side, and is elastically deformable in a second direction, the first side wall extends in the fitting direction to hold the second leg portion, and when a terminal of the partner connector is inserted into between the bottom portion, the first leg portion, and the second leg portion, the second leg portion and the first side wall are elastically deformed in the second direction, and wherein the lower surface of the mount portion forms the only mount portion of the terminal.

2. The electric connector according to claim 1, wherein the housing further has a cover portion, and the cover portion covers an upper surface of the bottom portion.

3. The electric connector according to claim 1, wherein the terminal includes a plurality of terminals, the housing further has a plurality of first inner walls, the plurality of terminals is arrayed along a third direction perpendicular to the fitting direction, the first direction, and the second direction, and the plurality of first inner walls extends in the first direction, and is formed so as to sandwich the first leg portion of each of the plurality of terminals in the third direction and be apart from the first leg portion of the each of the plurality of terminals.

4. The electric connector according to claim 3, wherein the plurality of terminals includes a pair of sets of a plurality of terminals arrayed so as to symmetrically face each other in the first direction, and the pair of sets of the plurality of terminals is arrayed such that the first leg portions of the pair of sets of the plurality of terminals face each other, the housing further has a second inner wall, and the second inner wall extends in the third direction, and is formed so as to face the first leg portions of the pair of sets of the plurality of terminals in the first direction.

5. The electric connector according to claim 1, wherein the terminal is formed such that a width of the second leg portion is greater than a width of the first leg portion.

6. The electric connector according to claim 1, wherein the housing further has a second side wall, the second side wall extends in the fitting direction to hold the first leg portion of the terminal, and when the terminal of the partner connector is inserted into between the bottom portion, the first leg portion, and the second leg portion, the first leg portion and the second side wall are elastically deformed in the first direction.

7. The electric connector according to claim 1, wherein the mount portion is configured to be connected to a board by soldering.

8. The electric connector according to claim 1, wherein the mount portion is located at the lowermost position along the fitting direction among an entirety of the terminal.

* * * * *